United States Patent
Datema et al.

(10) Patent No.: US 9,752,625 B2
(45) Date of Patent: Sep. 5, 2017

(54) DUAL CLUTCH COMPRISING TWO CLUTCH UNITS WHICH ACT IN A FORCE-FITTING MANNER

(71) Applicant: GKN STROMAG AG, Unna (DE)

(72) Inventors: Hendrik Datema, Hamm (DE);
Matthias Glomm, Iserlohn (DE);
Thomas Haeseker, Lauterhofen (DE)

(73) Assignee: STROMAG GMBH, Unna (DE)

( * ) Notice: Subject to any disclaimer, the term of this patent is extended or adjusted under 35 U.S.C. 154(b) by 0 days.

(21) Appl. No.: 14/651,481

(22) PCT Filed: Dec. 10, 2013

(86) PCT No.: PCT/EP2013/076116
§ 371 (c)(1),
(2) Date: Jun. 11, 2015

(87) PCT Pub. No.: WO2014/090817
PCT Pub. Date: Jun. 19, 2014

(65) Prior Publication Data
US 2015/0330461 A1    Nov. 19, 2015

(30) Foreign Application Priority Data

Dec. 12, 2012  (DE) .................. 10 2012 222 915

(51) Int. Cl.
*F16D 25/0638* (2006.01)
*F16D 21/06* (2006.01)
(Continued)

(52) U.S. Cl.
CPC ............. *F16D 21/06* (2013.01); *F16D 13/52* (2013.01); *F16D 13/69* (2013.01); *F16D 13/70* (2013.01);
(Continued)

(58) Field of Classification Search
CPC .............................................. F16D 2021/0607
(Continued)

(56) References Cited

U.S. PATENT DOCUMENTS 2,953,034 A    9/1960 Weaver
3,032,157 A *  5/1962 Richards .............. F16D 25/10
                                                188/152

(Continued)

FOREIGN PATENT DOCUMENTS

CN       101915276 A    12/2010
CN       201884506 U     6/2011
(Continued)

OTHER PUBLICATIONS

International Search Report issued in Application No. PCT/EP2013/076116 with English language translation dated Feb. 25, 2014 (6 pages).

(Continued)

*Primary Examiner* — Anna Momper
*Assistant Examiner* — Ryan Dodd
(74) *Attorney, Agent, or Firm* — Flynn, Thiel, Boutell & Tanis, P.C.

(57) ABSTRACT

Dual clutch including two clutch units acting in a force-fitting manner and mounted on a common clutch hub in a rotationally fixed and axially movable manner, a pressure disk arrangement retained between the clutch units on the clutch hub in an axially fixed manner and including two axially movable pressure pistons each of which can be ventilated by a compression spring arrangement positioned in the clutch hub. Each compression spring arrangement includes multiple compression springs, each of which is arranged in a recess of the clutch hub. Each recess is introduced into the clutch hub as an axially extending blind hole. The pressure disk arrangement is received in a radial (Continued)

groove of the clutch hub, the groove being radially and/or axially spaced from the blind holes.

18 Claims, 4 Drawing Sheets

(51) Int. Cl.
 *F16D 13/52* (2006.01)
 *F16D 13/69* (2006.01)
 *F16D 13/70* (2006.01)

(52) U.S. Cl.
 CPC .. *F16D 25/0638* (2013.01); *F16D 2021/0607* (2013.01); *F16D 2021/0661* (2013.01); *F16D 2021/0676* (2013.01); *F16D 2021/0692* (2013.01); *F16D 2300/12* (2013.01); *F16D 2300/14* (2013.01)

(58) Field of Classification Search
 USPC .................................................. 192/48.611
 See application file for complete search history.

(56) References Cited

U.S. PATENT DOCUMENTS

| | | | |
|---|---|---|---|
| 3,157,057 A | 11/1964 | Palmer et al. | |
| 3,472,350 A * | 10/1969 | Overson | F16D 21/06 |
| | | | 192/106 F |
| 4,044,869 A | 8/1977 | Gros | |
| 4,827,784 A * | 5/1989 | Muller | F16D 25/10 |
| | | | 192/106 F |
| 4,947,974 A | 8/1990 | Smemo et al. | |
| 5,031,739 A | 7/1991 | Flotow et al. | |
| 6,394,246 B1 | 5/2002 | Gassmann et al. | |
| 8,413,782 B2 | 4/2013 | Amano et al. | |
| 8,893,870 B2 | 11/2014 | Rank et al. | |
| 8,967,352 B2 * | 3/2015 | Kummer | F16D 21/06 |
| | | | 192/106 F |
| 2004/0206599 A1 * | 10/2004 | Hegerath | F16D 21/06 |
| | | | 192/48.611 |
| 2005/0082136 A1 | 4/2005 | Braford et al. | |
| 2005/0279606 A1 | 12/2005 | Heinrich | |
| 2006/0042909 A1 | 3/2006 | De Maziere | |
| 2006/0289263 A1 * | 12/2006 | Friedmann | F16D 13/58 |
| | | | 192/48.8 |
| 2009/0084652 A1 * | 4/2009 | Kummer | F16D 13/683 |
| | | | 192/113.1 |
| 2013/0199883 A1 * | 8/2013 | Akiba | F16D 25/082 |
| | | | 192/48.609 |
| 2013/0220761 A1 * | 8/2013 | Rank | F16D 25/0638 |
| | | | 192/48.9 |

FOREIGN PATENT DOCUMENTS

| | | | | |
|---|---|---|---|---|
| CN | 102562850 A | 7/2012 | | |
| DE | 10596 A | 9/1880 | | |
| DE | 26 18 356 B1 | 6/1977 | | |
| DE | 34 25 346 C2 | 1/1986 | | |
| DE | 10 2008 048 801 B3 | 6/2010 | | |
| DE | 10 2010 046 633 A1 | 3/2012 | | |
| DE | 2010046633 | * | 3/2012 | ............ F16D 25/01 |
| DE | WO2012/038159 | * | 3/2012 | ............ F16D 25/01 |
| EP | 1 686 277 A1 | 8/2006 | | |

OTHER PUBLICATIONS

Examination Report of German Patent Office issued in Application No. 10 2012 222 915.9 dated Jun. 14, 2013 (10 pages).

Catalogue No. D 228, Stromag: "Hydraulisch geschaltete Lamellenkupplungen fuer Schiffsgetriebe Hydraulicly Operated Multi-Disc Clutches for Marine Gears" Internet Citation, with English language translation 1999, pp. 1-17.

Office Action of Chinese Patent Office issued in Application No. 201380065279.5 with English translation dated Sep. 30, 2016 (12 pages).

* cited by examiner

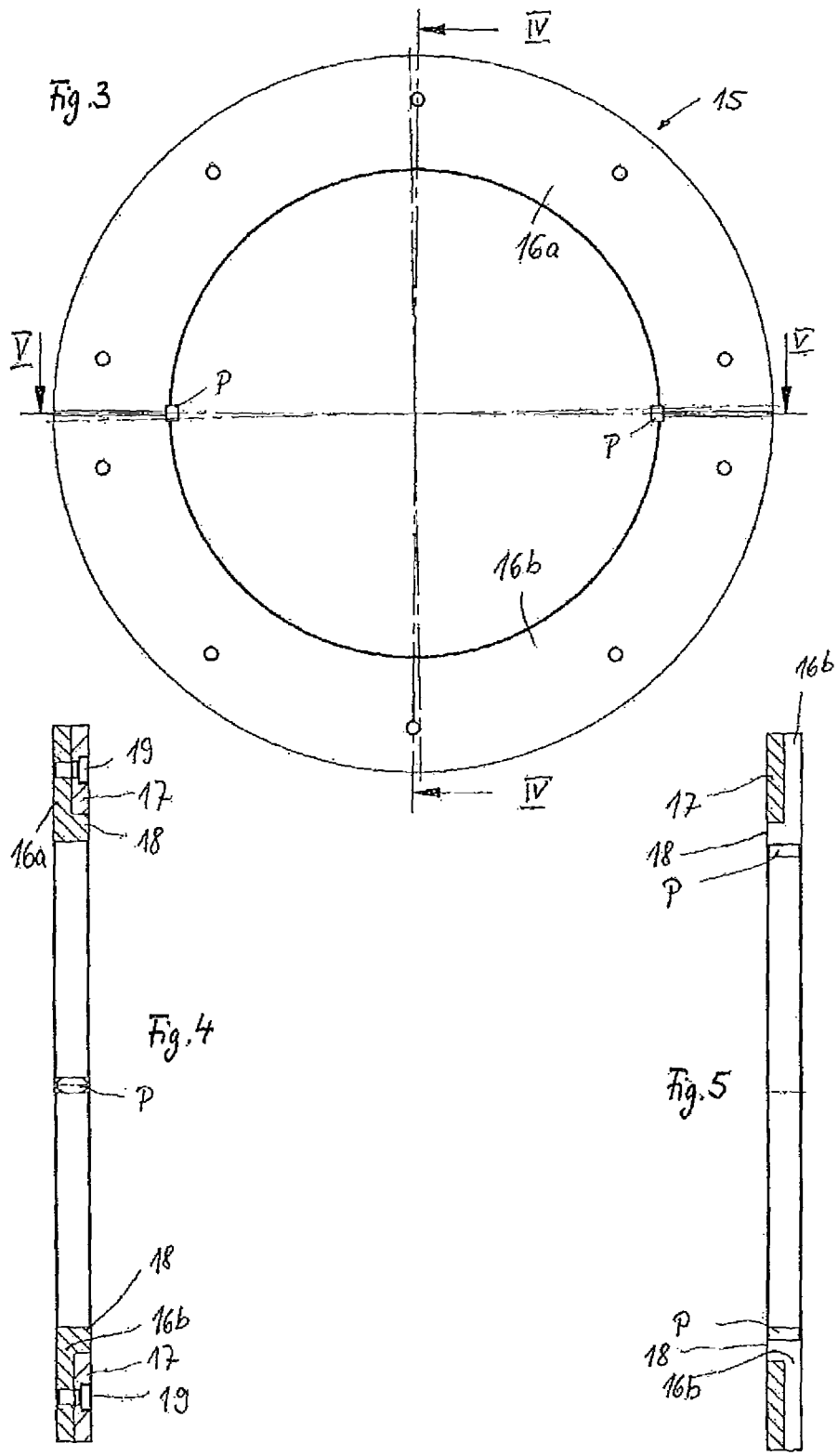

ure disk arrangements. In DE 10 2010 046 633 A1, removal of the pressure disk arrangement after successful initial
DUAL CLUTCH COMPRISING TWO CLUTCH UNITS WHICH ACT IN A FORCE-FITTING MANNER

FIELD OF THE INVENTION

The invention relates to a dual clutch comprising two clutch units, which act nonpositively and which are mounted on a common clutch hub for conjoint rotation and in an axially movable manner in relation to an axis of clutch rotation. A multipart pressure disk arrangement is provided, which is held in an axially fixed manner on the clutch hub between the clutch units, and includes two axially movable pressure pistons, each of which can be released by means of a compression spring arrangement positioned in the clutch hub, wherein apertures are provided for compression springs of the compression spring arrangements, and each aperture is introduced into the clutch hub as an axially extending blind hole.

BACKGROUND OF THE INVENTION

A dual clutch of this kind is known from Catalog No. D 228, dated 01.1999, published by Stromag AG. The known dual clutch has two plate packs, which are mounted for conjoint rotation and axial movement on a common clutch hub. The two plate packs are separated from one another by a pressure disk arrangement, which is seated externally on the clutch hub and is secured axially on the clutch hub. The two plate packs can each be acted upon by an axially movable pressure piston, which can each be transferred into a release position for the plate packs by means of a compression spring arrangement positioned in the clutch hub.

DE 10 2010 046 633 A1 discloses another dual clutch, in which a pressure disk arrangement is arranged axially between two plate packs. The pressure disk arrangement is accommodated in an outwardly open radial groove in the clutch hub. Corresponding compression springs of the compression spring arrangements for releasing the pressure pistons are supported on the pressure disk arrangement. The corresponding apertures of oppositely situated compression springs in the clutch hub are aligned coaxially with one another and are each formed by a common hole, which passes through the entire length of the clutch hub. The pressure disk arrangement is constructed from three parts, comprising two pressure disk segments, which adjoin one another in the circumferential direction, and a carrier ring, to which the pressure disk segments are axially connected.

SUMMARY OF THE INVENTION

It is an object of the invention to provide a dual clutch of the type stated at the outset which allows disassembly and reassembly.

This object is achieved by virtue of the fact that the pressure disk arrangement is accommodated in a radial groove in the clutch hub, said groove being spaced apart radially and/or axially from the blind hales in relation to the axis of clutch rotation. Accommodating the pressure disk arrangement in the radial groove ensures reliable fixing of the pressure disk arrangement on the clutch hub. By virtue of the fact that the radial groove is spaced apart radially and/or axially from the blind holes, the pressure disk arrangement can be assembled and disassembled without being affected by the position and functioning of the pressure disk arrangements. In DE 10 2010 046 633 A1, removal of the pressure disk arrangement after successful initial installation was virtually impossible since at least one compression spring arrangement is supported axially on the pressure disk arrangement and makes removal of the pressure disk arrangement impossible or possible only under more difficult conditions, owing to the high spring stress.

In a refinement of the invention, the pressure disk arrangement has at least two pressure disk segments, which adjoin one another in the circumferential direction, and a one-part carrier ring, to which the pressure disk segments are connected. Each pressure disk segment advantageously has an axially extending shoulder situated radially on the inside, which is adjoined radially on the outside by the carrier ring. In this arrangement, an axial extent of the shoulder preferably corresponds to an axial thickness of the carrier ring. In order to ensure exclusive frictional contact by the carrier ring, the carrier ring is preferably always slightly thicker than the axial extent of the shoulder. A radial distance of the shoulder from a radially outer boundary edge of the respective pressure disk segment advantageously corresponds to a radial extent of the carrier ring. By means of the refinements described, a contact surface on a flat part of the pressure disk arrangement is achieved for the clutch units, resulting in a particularly uniform surface pressure for the corresponding clutch units. In a further refinement, the radial extent of the carrier ring corresponds at least largely to a radial extent of an effective contact surface of the adjacent clutch unit. A plate pack comprising a plurality of inner and outer plates is preferably provided as a clutch unit. Both the carrier ring opposite the adjacent clutch unit and a face, facing the other clutch unit, of the at least two pressure disk segments form correspondingly flat contact surfaces extending radially in a continuous one-piece way. By virtue of the refinements, the carrier ring furthermore rests in an accurately fitting manner, with support radially on the inside, on the pressure disk segments, with the result that outer surfaces of the carrier ring end flush and in alignment with corresponding outer contours of the pressure disk segments. As a result, the pressure disk segments and the carrier ring rest against one another in a particularly compact way and in the form of a pack, ensuring that at most slight elastic deformations occur between the carrier ring and the pressure disk segments during clutch operation. These measures too result in particularly uniform surface pressure of the pressure disk arrangement relative to the adjacent clutch units, in particular plate packs. By virtue of the refinements described, the pressure disk segments and the carrier ring rest flat upon one another in such a way that power flow always takes place via the wide contact surfaces between the pressure disk segments and the carrier ring during clutch operation, even in the case of elastic deformations.

In a further refinement of the invention, the at least two pressure disk segments are each held spaced apart at the joints thereof as seen in the circumferential direction by a key, each of which keys is fitted into a complementary key slot in a base of the radial groove. This allows improved suitability of the pressure disk arrangement for fitting on the clutch hub.

By means of the solution according to the invention, it is possible to enable disassembly of the dual clutch from one axial side and, accordingly, replacement of the corresponding clutch units, in particular plate packs. The dual clutch according to the invention is advantageously provided for use in an industrial transmission, preferably for driving an exploration pump for delivering crude oil. As an alternative, the invention can also be used with machine tools, in industrial plants or on commercial vehicles.

DESCRIPTION OF THE DRAWINGS

Further advantages and features of the invention will become apparent from the following description of a preferred exemplary embodiment of the invention, which is illustrated by means of the drawings, in which:

FIG. 3 shows a multipart pressure disk arrangement of the dual clutch according to FIGS. 1 to 2b in an enlarged front view, FIG. 4 shows a section through the pressure disk arrangement along section line IV-IV in FIG. 3, and FIG. 5 shows another section through the pressure disk arrangement according to FIG. 3 along section line V-V in FIG. 3.

DETAILED DESCRIPTION

Figure 1:
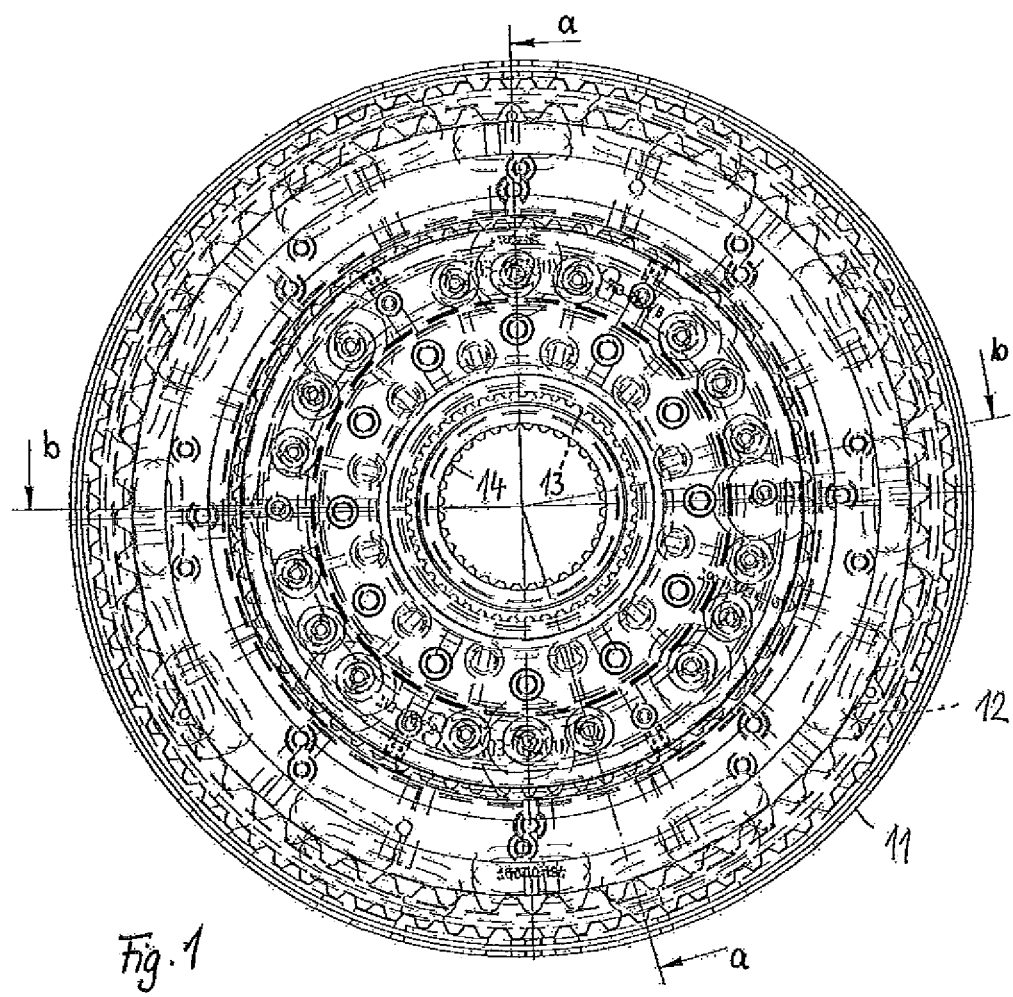
FIG. 1 shows one embodiment of a dual clutch according to the invention in a front view.
Figure 2A:
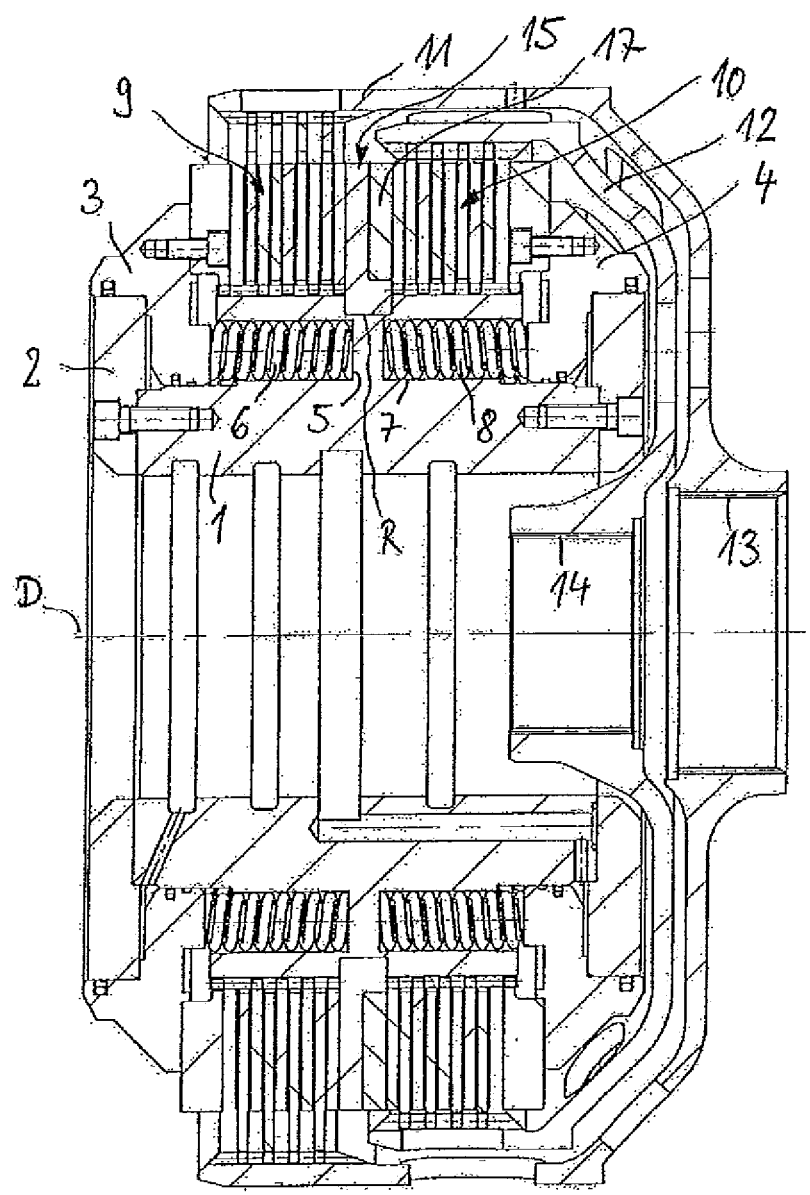
FIG. 2a shows a longitudinal section through the dual clutch along section line a-a in FIG. 1.
Figure 2B:
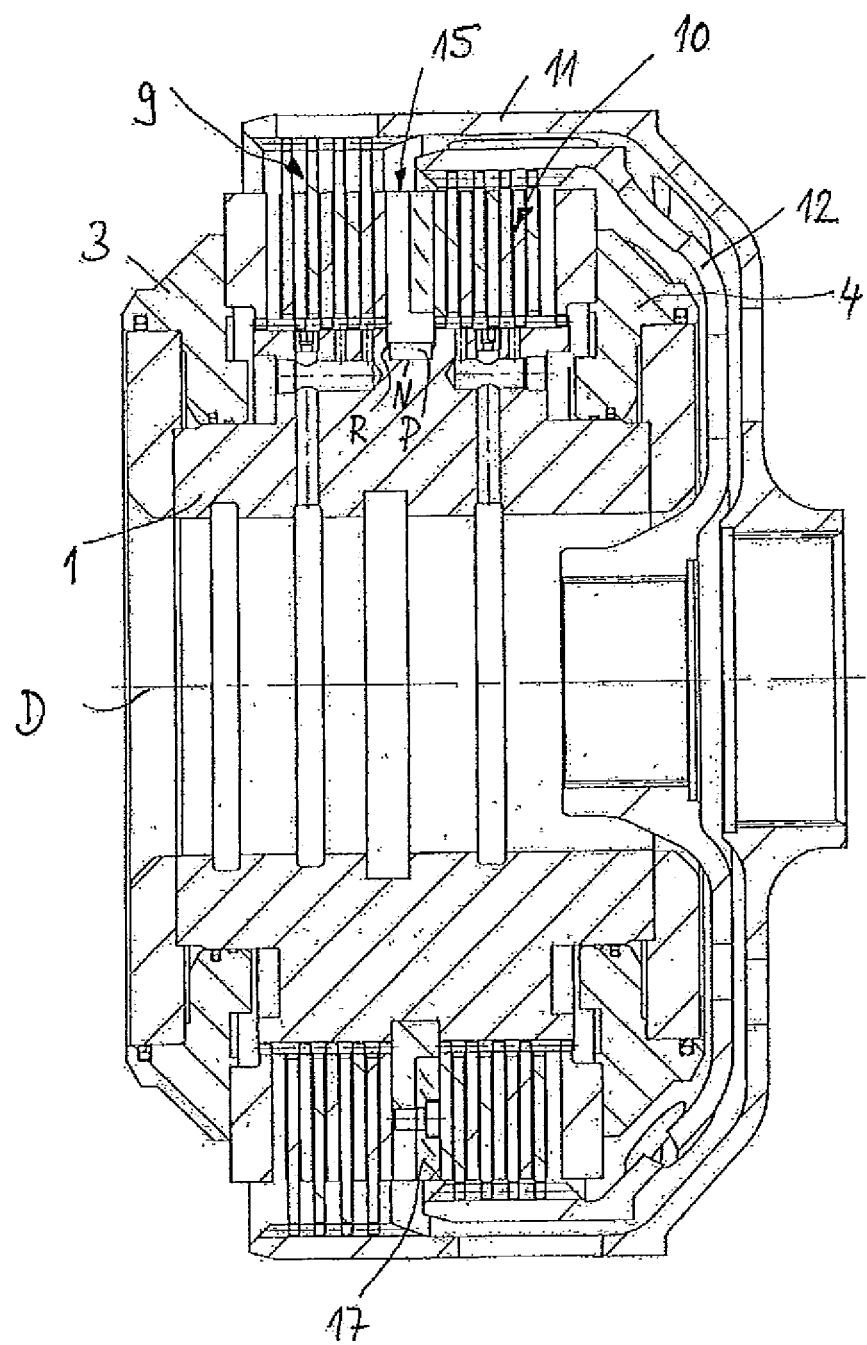
FIG. 2b shows a longitudinal section through the dual clutch according to FIG. 1 along section line b-b.

A hydraulic dual clutch according to FIGS. 1 to 5 has a single-part inner body 1 serving as a clutch hub in the sense according to the invention. A first pressure piston 3 is supported in an axially movable manner on the inner body 1 on the left-hand side, and a second pressure piston 4 is supported in an axially movable manner on said inner body on the right-hand side (relative to the drawings according to FIGS. 2a and 2b). The two pressure pistons 3 and 4 can be subjected to hydraulic pressure in opposite directions from one another. For this purpose, a first cylinder wall 2 is provided for the first pressure piston 3 on the left-hand side, and a second cylinder wall is provided for the pressure piston 4 on the right-hand side. Two clutch units in the form of two plate packs 9, 10, each consisting of a plurality of inner and outer plates, are arranged between the axially spaced pressure pistons 3 and 4. The inner plates of the two plate packs 9, 10 are held for conjoint rotation and axial movement by means of longitudinal splines extending axially with respect to an axis of clutch rotation D. The outer plates of the two plate packs 9, 10 are connected for conjoint rotation and axial movement, by means of corresponding external splines, to axially extending internal splines on two clutch bells 11, 12, wherein the clutch bell 11 associated with the left-hand plate pack 9 defines a first output 13, and the clutch bell 12 associated with the second plate pack 10 defines an output 14, which is aligned coaxially with the first output 13.

The two plate packs 9, 10 are separated axially from one another by a pressure disk arrangement 15, which is of ring-shaped configuration and is embedded in a radial groove R in the inner body 1, said groove being arranged in an axially central manner. The radial groove R is made deeper than corresponding axial groove depths of the axially extending plate splines on the inner body 1, as is readily apparent from FIGS. 2a and 2b.

A compression spring arrangement 5, 6; 7, 8 for each pressure piston 3, 4 is furthermore integrated into the inner body 1, said arrangement comprising a plurality of compression springs 6, 8 arranged in a manner distributed over the circumference of the inner body 1. The compression springs 6, 8 are of identical configuration to one another and are embodied as helical compression springs. Each compression spring 6, 8 is integrated into an associated aperture 5, 7 in the inner body 1. The apertures 5, 7 are introduced as blind holes into the inner body 1, from opposite ends of the latter, and extend parallel to the axis of rotation D of the dual clutch. Accordingly, each compression spring 6, 8 is supported axially on the inside against a base of the associated aperture 5, 7 (configured as a blind hole), which base is formed by a surface of the inner body 1 of the clutch hub, and exerts a pressure force on the corresponding pressure piston 3, 4 in the direction of release, in which the respective pressure piston 3, 4 is pushed axially away from the associated plate pack 9, 10. The radial groove R and the apertures 5, 7 do not merge into one another; on the contrary, they are separated from one another axially and radially, thus ensuring that the radial groove R is completely closed over its entire periphery, radially toward the inside and toward both axial sides.

The pressure disk arrangement 15 has a carrier ring 17, which is a single continuous part over its entire circumference and is connected to two semi-annular pressure disk segments 16a, 16b. Each semicircular pressure disk segment 16a, 16b has an axially projecting shoulder 18 in the form of a circular arc, which is provided radially on the inside of the respective pressure disk segment 16b. An axial extent of the shoulder 18 corresponds approximately to an axial thickness of the carrier ring 17. At the same time, it must be ensured that the axial thickness of the carrier ring 17 is always slightly greater than the greatest axial extent of the shoulder 18. This ensures that the flat outer surface of the carrier ring 17 always forms a corresponding friction surface for the adjacent plate pack 10 and that an end face of the shoulder 18 does not come into contact with the facing friction surface of the plate pack 10. A radial extent, from the radial outer side of the shoulder 18 to the radially outer boundary edge of each pressure disk segment 16a, 16b, is identical with the radial extent of the carrier ring 17, thus ensuring that, as illustrated in FIGS. 4 and 5, the carrier ring 17 lies flat and flush against a facing face of the respective pressure disk segment 16a, 16b by means of one face and otherwise ends flush and in alignment with the outer surfaces of the respective pressure disk segment 16a, 16b by means of its outer contour, both in the region of the shoulders 18 and in the radially outer rim region.

A key P is inserted radially on the inside at each of the two joints between the adjoining pressure disk segments 16a, 16b, said keys being assigned a corresponding key slot N in the radially inner base of the radial groove R in the inner body 1. During assembly of the pressure disk arrangement 15, the two keys P are inserted into the key slots N before the pressure disk segments 16a and 16b are placed on the inner body 1 radially from the outside and inserted radially into the radial groove R. The keys P make it easier to position the pressure disk segments 16a, 16b within the radial groove R. After the insertion of the pressure disk segments 16a, 16b, the carrier ring 17 is pushed axially over the inner body 1 and centered on the circular-arc-shaped shoulders 18 of the pressure disk segments 16a, 16b. The carrier ring 17 is then fixed on the pressure disk segments 16a, 16b by means of axially acting fastening means in the form of screw fasteners 19. For this purpose, the pressure disk segments 16a, 16b have threaded holes, and corresponding sockets for corresponding headed screws, which are screwed into the threaded holes, are provided in the carrier ring 17.

In the dual clutch illustrated by means of FIGS. 1 to 5, the plate packs 9, 10 can be replaced in a simple manner from one side of the clutch. This is the right-hand side of the clutch in the illustration according to FIGS. 2a and 2b. After the two clutch bells 11 and 12 have been pulled off axially, the cylinder wall associated with pressure piston 4 is removed. After the pressure piston 4 has been pulled off axially, plate pack 10 is removed axially. The carrier ring 17 of the pressure disk arrangement 15 is then screwed off the remaining pressure disk segment and removed axially to the right. The pressure disk segments 16a, 16b can then be pulled radially outward out of the radial groove R in the inner body 1. The first plate pack 9 is thus also exposed and can be removed axially from the inner body 1 via the right-hand side of the clutch. By means of correspondingly reversed assembly operations, a new plate pack 9, the pressure disk arrangement 15 and, if appropriate, another new plate pack 10 can then be installed again before pressure piston 4, the associated cylinder wall and the two clutch bells 11 and 12 are placed on again axially and fitted ready for operation.

The positioning of the keys P within the radial groove R for conjoint rotation in the circumferential direction ensures support for conjoint rotation for the pressure disk segments 16a, 16b and, consequently, secure driving in rotation together with the inner body 1. As is readily apparent from FIGS. 2a and 2b, a radial extent of the carrier ring 17 corresponds approximately to a radial extent of an effective contact surface of the adjacent inner plate of plate pack 10, wherein, radially on the outside, the carrier ring 17 also ends at least substantially in alignment with an outer rim of the corresponding inner plate. As a result, a contact surface which is flat throughout is obtained between the facing face of the carrier ring 17 and the contact surface, facing the carrier ring 17, of the adjacent inner plate of plate pack 10, thereby making it possible to achieve a particularly good surface pressure. Since the opposite faces of the pressure disk segments 16a, 16b, which face the other plate pack 9, also form a flat surface over their entire radial extent, a particularly uniform surface pressure is obtained on the side facing the other plate pack 9.

The invention claimed is:

1. A dual clutch comprising two clutch units mounted on a common clutch hub for conjoint rotation and axial movement in relation to an axis of clutch rotation, the dual clutch comprising a multipart pressure disk arrangement held in an axially fixed manner on the clutch hub between the clutch units, and two axially movable pressure pistons, each pressure piston being releasable by a compression spring arrangement positioned in the clutch hub, each compression spring arrangement comprising a plurality of compression springs, each of the compression springs being arranged in an aperture disposed in the clutch hub, each aperture comprising a blind hole, the pressure disk arrangement being disposed in a groove extending radially, in relation to the axis of clutch rotation, in the clutch hub, each of the blind holes extending axially inwardly, with respect to the axis of clutch rotation, within the clutch hub and having an axially innermost terminal end defined by a surface of the clutch hub disposed to close off the axially innermost terminal end, the blind holes being disposed in non-intersecting relation with the groove within the clutch hub.

2. The dual clutch as claimed in claim 1, wherein the blind holes and the groove are spaced-apart from one another so as not to communicate with one another.

3. The dual clutch as claimed in claim 1, wherein the groove has a radially innermost terminal end defined by a surface of the clutch hub and each of the blind holes defined in the clutch hub has an outermost radial extent defined by a substantially axially extending surface of the clutch hub, the radially innermost terminal end of the groove being disposed radially outwardly from the outermost radial extent of each of the blind holes.

4. The dual clutch as claimed in claim 1, wherein the groove and the blind holes are defined in the clutch hub so as not to communicate with one another within an interior of the clutch hub.

5. The dual clutch as claimed in claim 1, wherein the groove has a radially innermost area defined by the clutch hub, the radially innermost area of the groove being axially closed on opposite sides thereof by respective axially oriented surfaces of the clutch hub disposed immediately adjacent the radially innermost area of the groove.

6. The dual clutch as claimed in claim 1, wherein each of the blind holes opens axially outwardly from one axial side of the clutch hub and terminates axially inwardly from an opposite axial side of the clutch hub so as not to extend axially completely through the clutch hub.

7. The dual clutch as claimed in claim 1, wherein the pressure disk arrangement has a pair of semi-circular pressure disk segments oriented relative to one another to form a ring-shape and a carrier ring connected to the pressure disk segments, the pressure disk segments and the carrier ring all being disposed within the groove.

8. The dual clutch as claimed in 7, wherein each pressure disk segment has an axially extending shoulder disposed at a radially inner area of the respective pressure disk segment, each shoulder having an axially extending surface facing radially outwardly, the carrier ring being disposed adjacent the axially extending surfaces.

9. The dual clutch as claimed in claim 8, wherein an axial extent of the axially extending surface of each shoulder substantially corresponds to an axial thickness of the carrier ring.

10. The dual clutch as claimed in claim 8, wherein the axially extending surfaces are each disposed at a radial distance from a radially outer boundary edge of the respective pressure disk segment, each radial distance corresponding to a radial dimension of the carrier ring defined between inner and outer circumferences thereof.

11. The dual clutch as claimed in claim 1, wherein the carrier ring has a radial dimension defined between outer and inner circumferences thereof which substantially corresponds to an effective contact surface area of an adjacent one of the clutch units.

12. The dual clutch as claimed in claim 7, further including axially extending fastening elements which connect the pressure disk segments to the carrier ring.

13. The dual clutch as claimed in claim 1, wherein the pressure disk arrangement includes a pair of pressure disk segments, each pressure disk segment being semi-circular in shape and each having a pair of terminal ends, the pressure disk segments being mounted on the clutch hub with the terminal ends of one pressure disk segment disposed in facing and adjacent relation with the respective terminal ends of the other pressure disk segment such that the pressure disk segments together define a substantially continuous circular configuration.

14. The dual clutch as claimed in claim 13, wherein the pressure disk segments are circumferentially spaced apart from one another by a key disposed at a juncture defined between each adjacent and facing pair of terminal ends of the pressure disk segments, each key being fitted into a complementary key slot disposed in the clutch hub adjacent a radially inner end of the groove.

15. The dual clutch as claimed in claim 1, wherein each compression spring has an axially inner end disposed against the surface of the clutch hub and an axially outer end disposed to act on one of the pressure pistons.

16. A dual clutch comprising two clutch units mounted on a common clutch hub for conjoint rotation and axial movement in relation to an axis of clutch rotation, the dual clutch comprising a multipart pressure disk arrangement held in an axially fixed manner on the clutch hub between the clutch units, and two axially movable pressure pistons, each pressure piston being releasable by a compression spring arrangement positioned in the clutch hub, each compression spring arrangement comprising a plurality of compression springs, each of the compression springs being arranged in an aperture disposed in the clutch hub, each aperture comprising a blind hole extending axially, with respect to the axis of clutch rotation, into the clutch hub through only a portion of an axial extent thereof, the pressure disk arrangement being disposed in a groove extending radially, with respect to the axis of clutch rotation, in the clutch hub, the blind holes being disposed within the clutch hub in non-intersecting relation with the groove.

17. The dual clutch as claimed in claim 16, wherein the blind holes and the groove are spaced-apart from one another so as not to communicate with one another within the clutch hub.

18. The dual clutch as claimed in claim 16, wherein each compression spring has an axially inner end disposed against a surface of the clutch hub, the surface defining an axially innermost terminal end of the corresponding blind hole, and an axially outer end disposed to act on one of the pressure pistons.

\* \* \* \* \*